Nov. 10, 1936.   G. LEFORT DES YLOUSES   2,060,183
PROCESS FOR DESSICATION OF GASES CONTAINED IN NITROUS FUMES
Filed Aug. 6, 1931
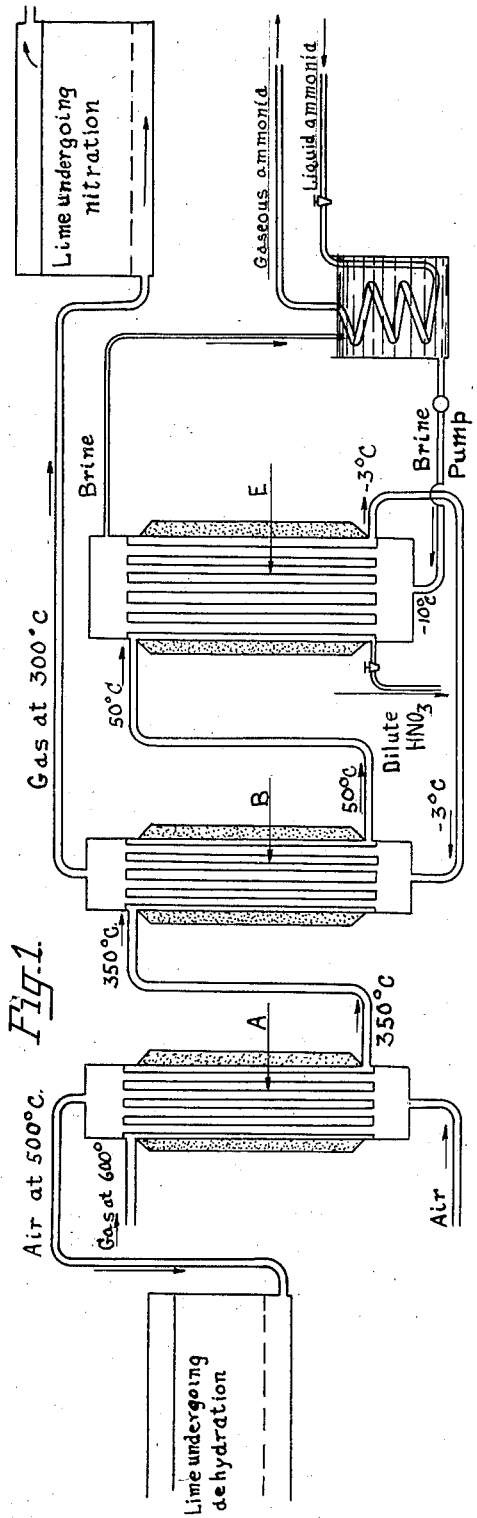
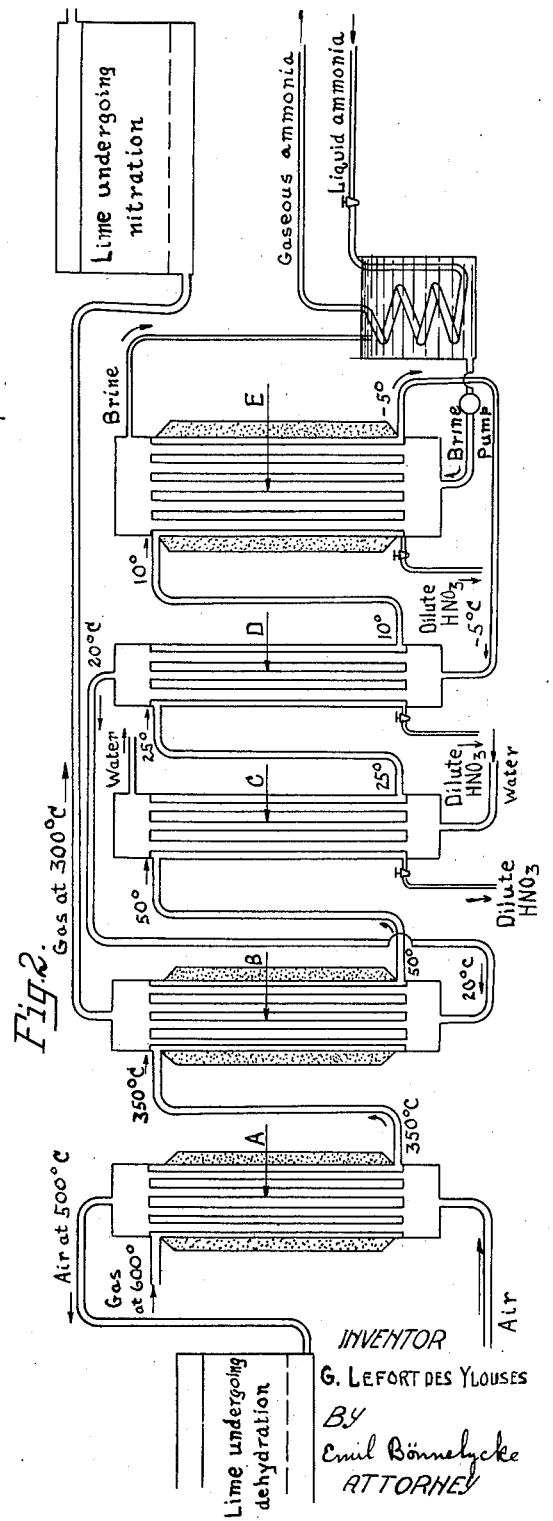
INVENTOR
G. LEFORT DES YLOUSES
BY
Emil Bönnelycke
ATTORNEY Patented Nov. 10, 1936

2,060,183

UNITED STATES PATENT OFFICE 2,060,183

PROCESS FOR DESICCATION OF GASES CONTAINED IN NITROUS FUMES

Gaston Lefort des Ylouses, Boulogne-sur-Seine, France, assignor to L'Azote Francais, a corporation of France Application August 6, 1931, Serial No. 555,638
In France November 28, 1930

7 Claims. (Cl. 23—161)

It is well known that gases containing nitrogen oxides must be thoroughly dried prior to absorption of the nitrogen oxides by quicklime.

Since these gases must be at a high temperature of about 300° C., low temperature treatments of the gases have not been employed to effect drying because of a number of disadvantages:

(1) When using electric arc gases it has been found that the permissible water content should not exceed 1 gram of water per cubic meter of gases. To reduce the water content to this value, it is necessary to cool the gases to temperatures between —18° to —22° C. Such a procedure is very expensive and complicated as the water will condense principally in the solid phase.

(2) It was illogical to cool to such low temperatures gases which were subsequently to be employed at about 300° C.

The present invention overcomes this disadvantage and presents a particularly interesting procedure for the drying of gases resulting from the oxidation of ammonia prior to contacting them with quicklime for the absorption of the nitrogen oxides NO, $NO_2$ and $N_2O_4$ contained therein.

In order to amplify the description of the present invention, reference is made to the accompanying drawing, in which:

Figure 1 is a schematic view of apparatus which may be used for carrying out the drying procedure of the present invention, and Fig. 2 is another schematic view showing a modification of the present invention.

It has been found that moisture in the gases contacted with the lime is injurious in that the nitrate formed on the surface of each piece of lime is hydrated. Due to the fact that the hydrated calcium nitrate is fusible at the temperature employed, the pieces of lime become coated with the fused salt which renders the same impervious to the gases and consequently terminates the absorption.

The gases resulting from the oxidation of ammonia are at least about 3 to 3.5 times as concentrated as the electric arc gases and consequently about 3 to 3.5 grams of water per cubic meter of gases resulting from the oxidation of ammonia are permissible. For drying the ammonia oxidation gases, it is sufficient to cool them to about —5° and —6° C., if condensation is to take place in the form of ice.

In accordance with the present invention, the gases containing the nitrogen oxides are subjected to cooling for a time sufficient to effect the oxidation of nitrous oxide to nitric oxide. This results in the formation of nitric acid as the condensation takes place and presents the following advantages:

(1) The moisture condensed, being in the form of nitric acid, can be cooled to —10° C. without freezing and at the temperature employed (—5° C. to —6° C.), may be removed in the liquid phase. This avoids a defrosting procedure which is necessary if the moisture is condensed in the solid phase.

(2) Since the vapor pressure of nitric acid even when diluted is lower than that of water, it will suffice to cool the gases to about —3° or —4° C., instead of —5° or —6° C., to reduce the water content of the gases to that permissible (i. e., 3 to 3.5 grams per cubic meter of gases).

Upon studying the injurious action of water on the absorption procedure, I have found that the layer of fused hydrated calcium nitrate formed on the surface of the lime as a result of the moisture contained in the gases will not limit the absorption unless it has obtained a certain thickness. This indicates that the surface of the pieces should be increased relative to the mass thereof. The quantity of water permissible in the gases depends upon the surface of the lime exposed and with the increased surface-mass ratio the permissible water content of the gases can be increased. It will be sufficient to decrease the dimension of the lime pieces and to use granules of a few millimeters. When using lime with an increased surface-mass ratio, the gases need be cooled only to about 0° or —2° C. to effect a sufficiently complete drying to avoid disturbance of the nitrogen oxide absorption.

In practice, drying is entirely sufficient at a temperature of —3° to —5° C.

In order to better utilize the requisite calories and to finally heat the gases at their utilization temperature, i. e. near 300° C., the arrangement shown, by way of example, on Figure 1 has been adopted, when treating gases proceeding from ammonia oxidation.

These gases, at a temperature of about 600° C. pass into a heat exchanger A, where they will be cooled by means of an air draft. This air is heated to about 500° C. by exchange of heat with the gases and is passed in contact with granules of hydrated lime. By subjecting the granules of hydrated lime to the action of air at this temperature, they are burned or transformed into granules of quicklime. The gases containing nitrous oxides are thus cooled to about 350° C. They arrive then into another heat exchange unit B through which they pass in an opposite direction to the gases cooled to about −3° C. This exchanger cools the gases from 350° C. to about +50° C. They pass then into a nest of tubes E cooled down to about −10° C. by means of brine.

In this apparatus E the gases are cooled down to about −3° C. and give up their moisture in the form of diluted nitric acid. This acid is discharged by intermittent regular or even continuous draining. This latter cooler is built of special metal not attacked by nitric acid. It has a wide passage for the gases so that they may remain in the apparatus for a time sufficient to allow oxidation of NO into $NO_2$ and production of nitric acid to take place.

The gases cooled down to −3° C. return to the second heat exchanger where they are heated up to 300° C. by the incoming gas at 350° C., wherefrom they are passed to an apparatus for absorption by quicklime. In the case of gases proceeding from ammonia oxidation and if the ammonia for the oxidation has been produced in a liquid state, an additional cooling may be brought about advantageously through evaporation of this liquid ammonia in a coil or nest of tubes before its being fed into the oxidizing catalyzers. This cooling may be brought about either directly by evaporation of ammonia or by means of brine cooled by evaporation of ammonia.

In case of very moist gases, highly concentrated, as those mentioned, proceeding from ammonia oxidation, the oxidation of NO into $NO_2$, the condensation of water and the formation of nitric acid produce a rather large quantity of heat. In order to reduce to a minimum the amount of cooling produced by the cold brine and to continue using the heat of the wet gases to reheat the dry gases, it will be of advantage to divide the heat exchanger B in two parts and to insert therebetween a water cooler (water-condenser) which will cool down the gases from about 50° to about 25° C. A large quantity of the water will condense therein, and, at the same time, $NO_2$ will be transformed into $N_2O_4$, with formation of a small amount of nitric acid. The heat thus developed is carried away by the condenser-water, and consequently, the brine-cooler will not absorb it.

Figure 2 shows such an arrangement. The heat exchanger A serves to produce the hot air necessary for dehydrating lime, C is the water condenser, E the brine-cooler, B and D the heat exchangers cooling down the hot and moist gases by means of cold and dry gases.

It is obvious that the above mentioned embodiments are not of a limiting character and may undergo any constructive modifications without exceeding the scope of the present invention.

Having now particularly described and ascertained the nature of my said invention and in what manner the same is to be performed I declare that what I claim is:

1. A method of drying high temperature, nitrous oxides and moisture containing gases evolved from ammonia oxidation for absorption by quicklime, comprising first cooling the gases to a temperature slightly above the freezing point of the moisture to effect condensation of a portion of the moisture in the liquid phase and the formation of dilute nitric acid, then cooling the gases to temperatures ranging from slightly below the freezing point of the moisture to slightly above the freezing point of the dilute nitric acid formed therein, to effect the final removal of moisture from the gases as a liquid condensate, and transferring heat, removed from the high temperature gases during cooling, by heat exchange, to the dried cold gases to facilitate their absorption by the quicklime.

2. In the absorption by quicklime of nitrous oxides from high temperature gases containing moisture and particularly from gases evolved from ammonia oxidation, the method of avoiding the formation of coatings of hydrated calcium nitrate on the quicklime comprising cooling the gases to about 10° C. to effect condensation of moisture and the formaton of dilute nitric acid by the interaction of the moisture with the nitrous fumes, then cooling the gases to temperatures below 0° C. but above the freezing point of the dilute nitric acid to effect the final removal of moisture therefrom as a liquid condensate, and transferring heat, by heat exchange removed from the high temperature gases during cooling, to the dried cold gases to facilitate their absorption by the quicklime.

3. In the absorption by quicklime of nitrous oxides from high temperature gases containing moisture and particularly from gases evolved from ammonia oxidation, the method of avoiding the formation of coatings of hydrated calcium nitrate on the quicklime comprising first cooling the gases to a temperature slightly above the freezing point of the moisture to effect condensation of a portion of the moisture in the liquid phase and the formation of dilute nitric acid, then cooling the gases to temperatures ranging from slightly below the freezing point of the moisture to slightly above the freezing point of the dilute nitric acid formed therein, to effect the final removal of moisture from the gases as a liquid condensate, and transferring heat, removed from the high temperature gases during cooling, by heat exchange to the dried cold gases to facilitate their absorption by the quicklime.

4. In the absorption by quicklime of nitrogen oxides contained in gases and particularly in gases evolved from ammonia oxidation, the method of subjecting the gases to a refrigerating drying treatment whereby the gases are desiccated to reduce the moisture content at least to that permissible for good absorption of the nitrogen oxides by quicklime, comprising passing the gases at a high temperature in heat exchange relation with a cooling medium to partially cool the gases, passing the partially cooled gases in heat exchange relation with a refrigerating medium and thereby cooling the gases to a temperature of −10° to 0° C., separating the condensate, passing the cold gases in heat exchange relation with the gases in the process of being cooled to reheat the cold gases to an absorbing temperature, and supplementing the cooling of the wet gases by evaporating liquid ammonia in heat exchange relation therewith.

5. In the absorption by quicklime of nitrogen oxides contained in gases and particularly in gases evolved from ammonia oxidation, the method of subjecting the gases to a refrigerating drying treatment whereby the gases are desiccated to reduce the moisture content at least to that permissible for good absorption of the nitrogen oxides by quicklime, comprising passing the gases at a high temperature in heat exchange relation with a cooling medium to partially cool the gases, passing the partially cooled gases in heat exchange relation with a refrigerating medium and thereby cooling the gases to a temperature of −10° to 0° C. to obtain a liquid phase condensate consisting of dilute nitric acid, separating the condensate, passing the cold dry gases in heat exchange relation with the wet gases undergoing cooling, and supplementing the cooling of the wet gases by evaporating liquid ammonia for the ammonia oxidation in heat exchange relation with the wet gases.

6. In the absorption by quicklime of nitrogen oxides contained in gases and particularly in gases evolved from ammonia oxidation, the method of subjecting the gases to a refrigerating drying treatment whereby the gases are desiccated to reduce the moisture content at least to that permissible for good absorption of the nitrogen oxides by quicklime, comprising passing the gases at a high temperature in heat exchange relation with a current of air to partially cool the gases, passing the partially cooled gases in heat exchange relation with cold water, then passing the gases in heat exchange relation with a refrigerating medium and thereby cooling the gases to a temperature of $-10°$ to $0°$ C., separating the condensate in the form of dilute nitric acid, and passing the cold dry gases first in heat exchange relation with the wet gases while flowing between the water and refrigerating medium cooling steps and subsequently in heat exchange relation with the wet gases while flowing between the air and water cooling steps.

7. A method of drying high temperature gases containing nitrogen oxides for high temperature absorption of the nitrogen oxides in lime, comprising passing a stream of wet gases from an ammonia oxidation and at a temperature of about $600°$ C. in heat exchange relation with a current of air and thereby reducing the temperature of the gases to about $350°$ C., further cooling the gases in stages to about $50°$, $25°$, $10°$ and $-10°$ to $0°$ C., respectively, separating the condensate in the form of dilute nitric acid in the liquid phase, passing a stream of water in heat exchange relation with the gases at about $50°$ C. and thereby reducing them to about $25°$ C., passing the cold dry gases serially first in heat exchange relation with the wet gases at about $25°$ C. and secondly in heat exchange relation with the gases at about $350°$ C. and thereby cooling the gases from $350°$ C. to $50°$ C. and from $25°$ to $10°$ C. and simultaneously heating the dry gases to about $300°$ C., and cooling the wet gases from about $10°$ C. to about $-10°$ to $0°$ C. by passing the same in heat exchange relation with a refrigerating medium.

GASTON LEFORT DES YLOUSES.